(12) United States Patent
Merz et al.

(10) Patent No.: US 8,528,455 B2
(45) Date of Patent: Sep. 10, 2013

(54) DEVICE FOR CLAMPING A BLADE OF SHEARS, USED IN THE TRANSVERSAL CUTTING OF STRIPS

(75) Inventors: Juergen Merz, Kreuztal (DE); Jochen Muenker, Kreuztal (DE)

(73) Assignee: SMS Siemag AG, Duesseldorf (DE)

( * ) Notice: Subject to any disclaimer, the term of this patent is extended or adjusted under 35 U.S.C. 154(b) by 70 days.

(21) Appl. No.: 13/418,493

(22) Filed: Mar. 13, 2012

(65) Prior Publication Data

US 2012/0204698 A1   Aug. 16, 2012

Related U.S. Application Data

(63) Continuation-in-part of application No. 11/666,201, filed as application No. PCT/EP2005/012876 on Dec. 2, 2005, now abandoned.

(30) Foreign Application Priority Data

Dec. 4, 2004   (DE) .................. 10 2004 058 491

(51) Int. Cl.
  *B23D 25/12*   (2006.01)
(52) U.S. Cl.
  USPC ........................................ 83/348; 83/698.31
(58) Field of Classification Search
  USPC ................. 83/698.11, 315, 284, 348, 698.31; 254/93 R
  See application file for complete search history.

(56) References Cited

U.S. PATENT DOCUMENTS

| | | | | |
|---|---|---|---|---|
| 1,031,528 | A | * | 7/1912 | Cole ................................ 91/533 |
| 1,048,301 | A | * | 12/1912 | Dittman .......................... 92/110 |
| 3,687,015 | A | * | 8/1972 | Chavarria ......................... 92/53 |
| 4,248,046 | A | * | 2/1981 | Fornell ............................. 60/567 |
| 4,372,327 | A | * | 2/1983 | Dyett et al. ...................... 131/95 |
| 4,412,467 | A | * | 11/1983 | DeSanto .......................... 83/346 |
| 4,499,910 | A | * | 2/1985 | Dyett et al. ...................... 131/95 |
| 4,590,846 | A | * | 5/1986 | Stoll ................................ 92/151 |
| 4,915,553 | A | * | 4/1990 | Lazarevic ...................... 409/233 |
| 5,522,302 | A | * | 6/1996 | Yuda et al. ....................... 91/533 |
| 2003/0188611 | A1 | * | 10/2003 | Solberg ............................. 83/13 |
| 2006/0174736 | A1 | * | 8/2006 | Bloy et al. ........................ 83/13 |

FOREIGN PATENT DOCUMENTS

| | | |
|---|---|---|
| JP | 03-209599 | 9/1991 |
| SU | 1119789 | 10/1984 |
| SU | 1512766 | 10/1989 |

* cited by examiner

*Primary Examiner* — Sean Michalski
(74) *Attorney, Agent, or Firm* — Abelman, Frayne & Schwab

(57) ABSTRACT

A device for clamping a blade of shears for traverse cutting of strips includes a clamping bar for the clamping the blade, and a device for displacing the clamping bar in its release position, with the device having a first piston having a piston rod connected at its end remote from the piston with the clamping bar, and a second piston spaced from the first piston and having a piston rod section acting on the first piston, a first connection-bore connects the space in the front of the first piston with the space in the front of the second piston, and a second connection bores connects the space behind the second piston with the space behind the first piston, wherein the first and second connection bores are formed in the rod section of the second piston.

11 Claims, 6 Drawing Sheets

DEVICE FOR CLAMPING A BLADE OF SHEARS, USED IN THE TRANSVERSAL CUTTING OF STRIPS

RELATED APPLICATIONS

This application is a continuation-in-part of application Ser. No. 11/666,201 filed Apr. 23, 2007 which is a national stage application of International application PCT/EP2005/012876 filed Dec. 2, 2005 that claims priority of German application DE 10 2004 058 491.5 filed Dec. 4, 2004, the three applications being incorporated herein by reference thereto.

BACKGROUND OF THE INVENTION

1. Field of the Invention

The invention relates to a device for clamping a blade of shears for transverse cutting of strips, in particular, shears for transverse cutting of rolled strips and/or cropping shears and formed of clamping wedge, cover, compression spring, piston rod, and piston.

2. Description of the Prior Art

DE 34 23 275 A1 discloses a device for forming a blade gap in drum shears, a blade drum of which is stationary arranged on a pair of carrier shafts with helical drive gear wheels, and has elongate recesses for receiving blade bars.

The blade bar is fixedly clamped with a clamping wedge subjected to the action of a spring package via a tie rod. The tie rod carries, at its end remote from the clamping wedge, a piston displaceable in a cylinder, and which is subjected to action of pressure medium fed via a feeding conduit. When the piston is subjected to the pressure medium, the clamping wedge is displaced against the action of the spring package outside of the clamping position, and the blade bar can slide in the elongate recess.

The clamping device of DE 34 23 275 A1 is shown in detail in FIG. 1.

For an exchange of the blade bar, the clamping wedge is also released, as described above. The blade bar can be arranged in a blade drum and in another manner. DE 199 53 908 A1 describes a blade supporting bridge that forms only a section of a blade drum.

The drawback of the available clamping systems consists in that the release pressure which acts on the piston, limits the maximal clamping force with which a blade can be clamped. The clamping force influences the available cutting force of shears. Therefore, the greater the clamping force, the greater is the cutting force of the shears.

Therefore, an object of the invention is to provide a device of the above-described type that would increase the force for releasing the blade.

SUMMARY OF THE INVENTION

The object of the invention is achieved by providing a device for clamping a blade of shears for transverse cutting a strip and having a blade drum defining an elongate recess for receiving the blade. The clamping device includes a clamping bar for clamping the blade in the elongate recess, a compression spring for biasing the clamping bar into its clamping position and means for displacing the clamping bar in its release position. The displacing means includes an elongate housing located in the blade drum and defining first and second chambers separated by a housing section extending transverse to a longitudinal extent of the housing. A first piston is displaceable in the first chamber and has a piston rod connected, at its end remote from the piston, with the clamping bar with the compression spring being located in the first chamber and engaging, at a spring end remote from the clamping bar, the first piston. A second piston displaceable in the second chamber and has a rod section extendable through a bore formed in the transverse housing section and engageable with the first piston for applying pressure thereto upon application of pressure to the second piston. The space in front of the first piston and the space in front of the second piston communicate with atmosphere, and space behind the first piston and in space behind the second piston communicate with a fluid source. Connection bores are provided for communicating the space behind the second piston with the space behind the first piston.

By increasing the pressure surface by using a second piston, there is provided, in addition to the total pressure surface of the rear piston, an additional or further pressure surface in form of an annular surface. Both surfaces are subjected to action of the pressure medium and apply pressure to the compression spring together. Thereby, the clamping bar releases the blade, making it free. By compressing the compression spring, as described above, the blade is displaced in the elongate opening or is completely taken out for exchange or sharpening. The clamping bar is connected with the piston rod. To this end, a screw connection or a hammer head connection are suitable. A plurality of clamping devices are distributed over the length of the blade drum or the blade supporting bridge.

The pressure medium for releasing the clamping bar is fed to separate clamping devices from a central supply source. Therefore, all of the clamping devices for a blade can be released simultaneously by application of head pressure.

The decisive advantage of the inventive device consists in that the maximal cutting force of the shears is not limited anymore by the blade clamping force. Therefore, thicker and/or wider strips or strips having a higher hardness can be cut at the same size of the shears.

Further, because of the inner geometry, the load on the adjacent components changes. E.g., the cover of the clamping cylinder is loaded by half of the load.

An embodiment of the invention would be described in detail with reference to the drawings.

DETAILED DESCRIPTION OF THE PREFERRED EMBODIMENTS

Figure 1:
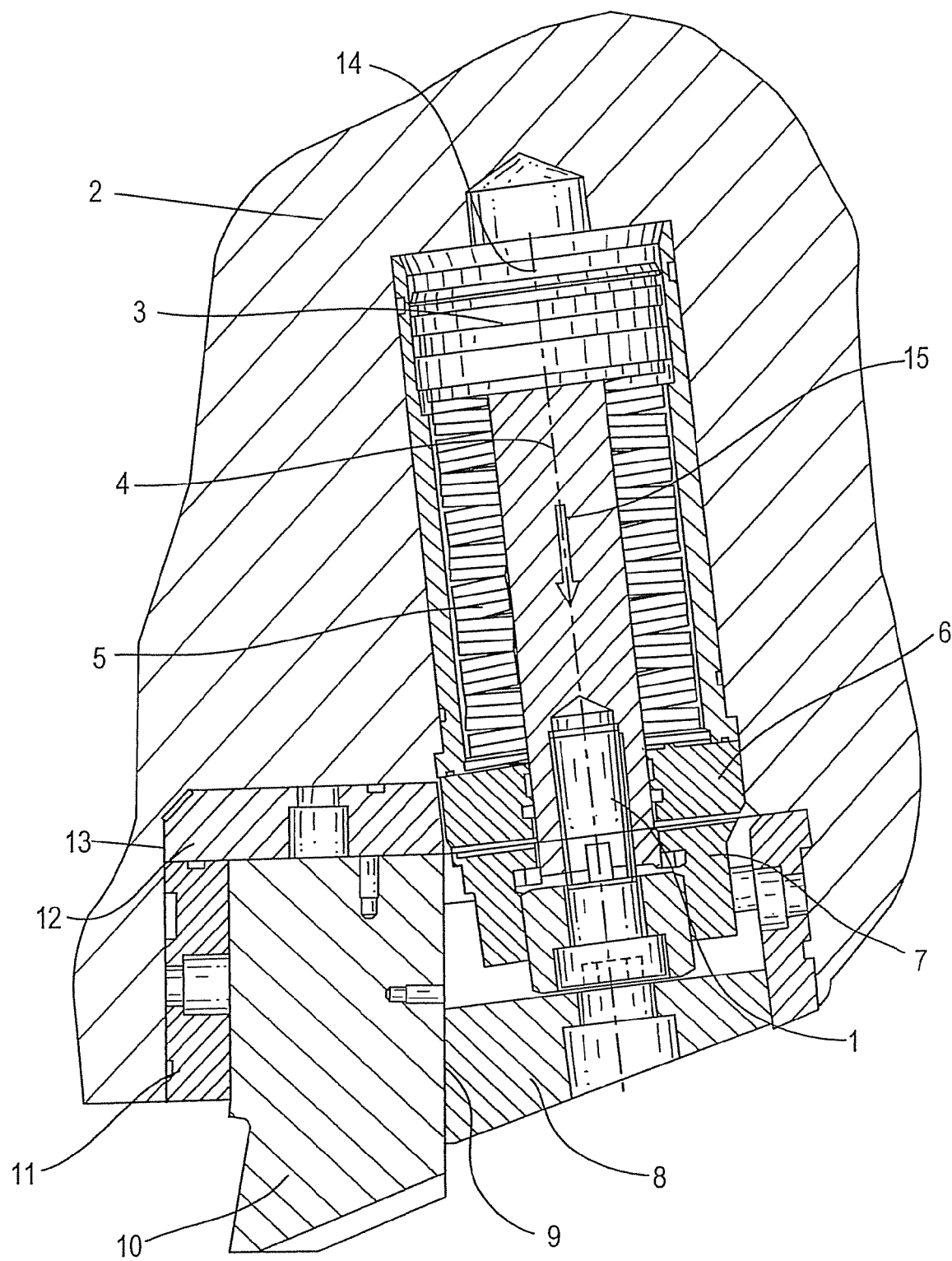
FIG. 1 a cross-sectional view of a prior art clamping device.

In the FIG. 1 a clamping device 1 in a blade drum 2 is shown. The clamping device 1 is formed of a piston 3, a piston rod 4, a compression spring 5, a cover 6, and an attachment device 7 for a clamping bar 8.

The clamping bar 8 presses with an inclined surface 9 a blade 10 against stop bars 11 and 12 which limit an elongate recess 13 for receiving the blade 10. For insertion or release of the blade 10, a pressure medium is applied to a rear surface 14 of the piston 3. Thereby, the piston 3 is displaced, together with the piston rod 4, in a direction of arrow 15, whereby simultaneously, the compression spring 5, in the present case a package of conical disc springs, becomes compressed. The clamping bar 8, which is likewise displaced in the direction of arrow 15, releases the blade 10. The blade 10 can now be taken out or displaced.

Figure 2:
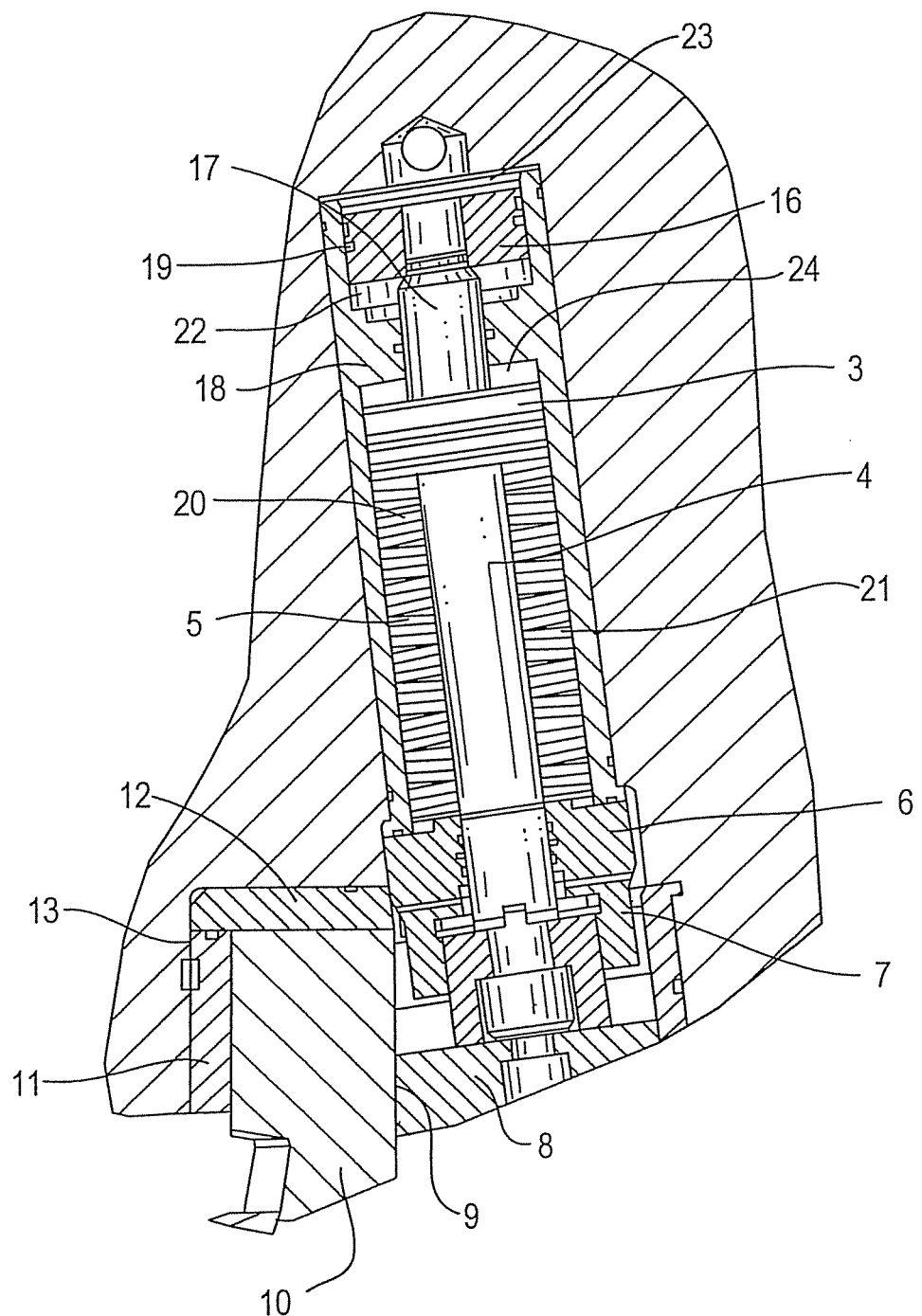
FIG. 2 a cross-sectional view of a prior art clamping device according to the present invention.

The device, which is known from FIG. 1, is changed according to FIG. 2 in that there is provided an additional piston 16 which is arranged at a distance from the known piston 3.

Figure 2A:
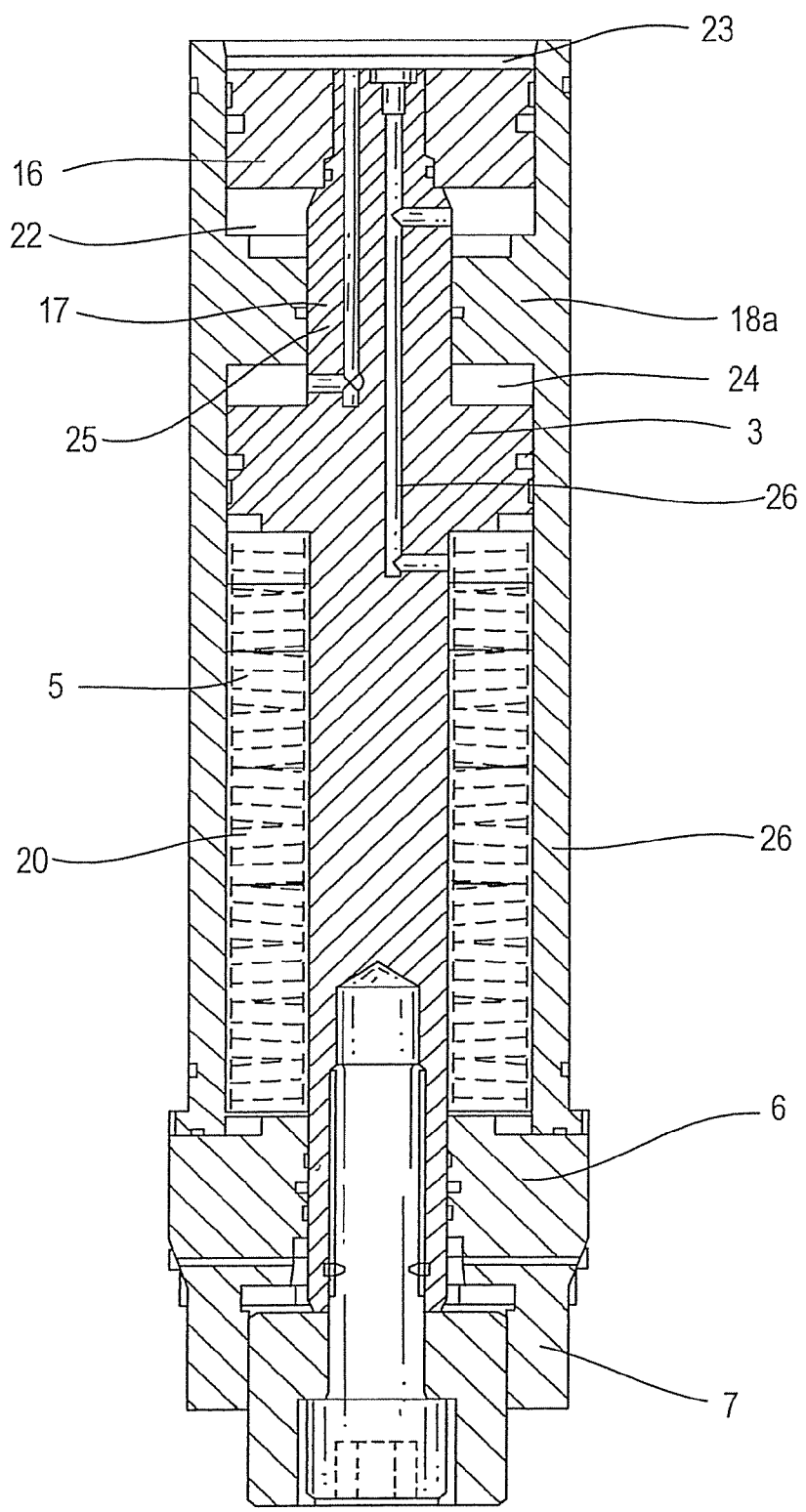
FIG. 2a a cross-sectional view substantially similar to that of FIG. 2 at an increased, in comparison with FIG. 2, scale.

FIG. 2a shows in details the arrangement of the pistons 3 and 16 and their connection. According to the invention, there is provided a common, elongate one-piece housing 18 which is separated in two chambers 20 and 22 by a cylindrical section 18a that extends transverse to the longitudinal axis of the housing 18. The piston 16 has a rod section 17 which is displaceable in the cylindrical section 18 of the one-piece housing 18. The pistons 3, 16 and the piston rod 17 all have seals 19, shown in FIG. 2. The chamber 20, which receives the conical disc spring package 21, and the chamber 22 in front of the rear piston 16 are under environmental pressure, whereas the chamber 23 behind the rear piston 16 and the annular chamber 24 behind the front piston 3 are subjected to application of pressures medium (now shown). The pressurized chambers 23 and 24 are connected with each other by a bore 25, and the chambers 20 and 22 are connected with each other and with the atmosphere by a bore 26. Advantageously, the both bores 25, 26 are formed in the piston rod 17, which permits to reduce the overall dimensions of the housing 18.

Further, advantageously, the piston 3, the piston rod 4, and the piston rod section 17 are formed as a one-piece member.

Figure 3:
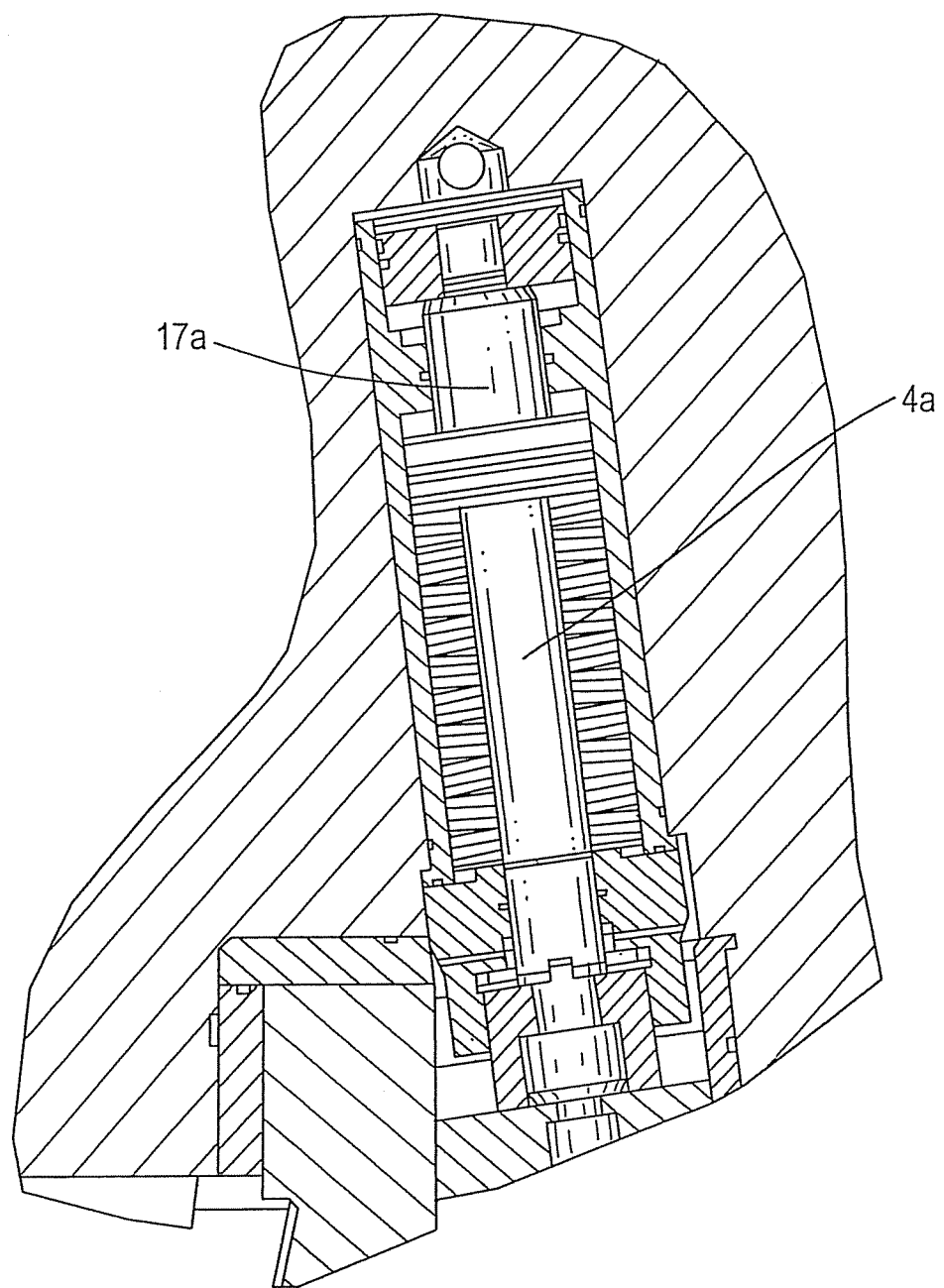
FIG. 3 a cross-sectional view of a further embodiment of a clamping device according to the invention.
Figure 4:
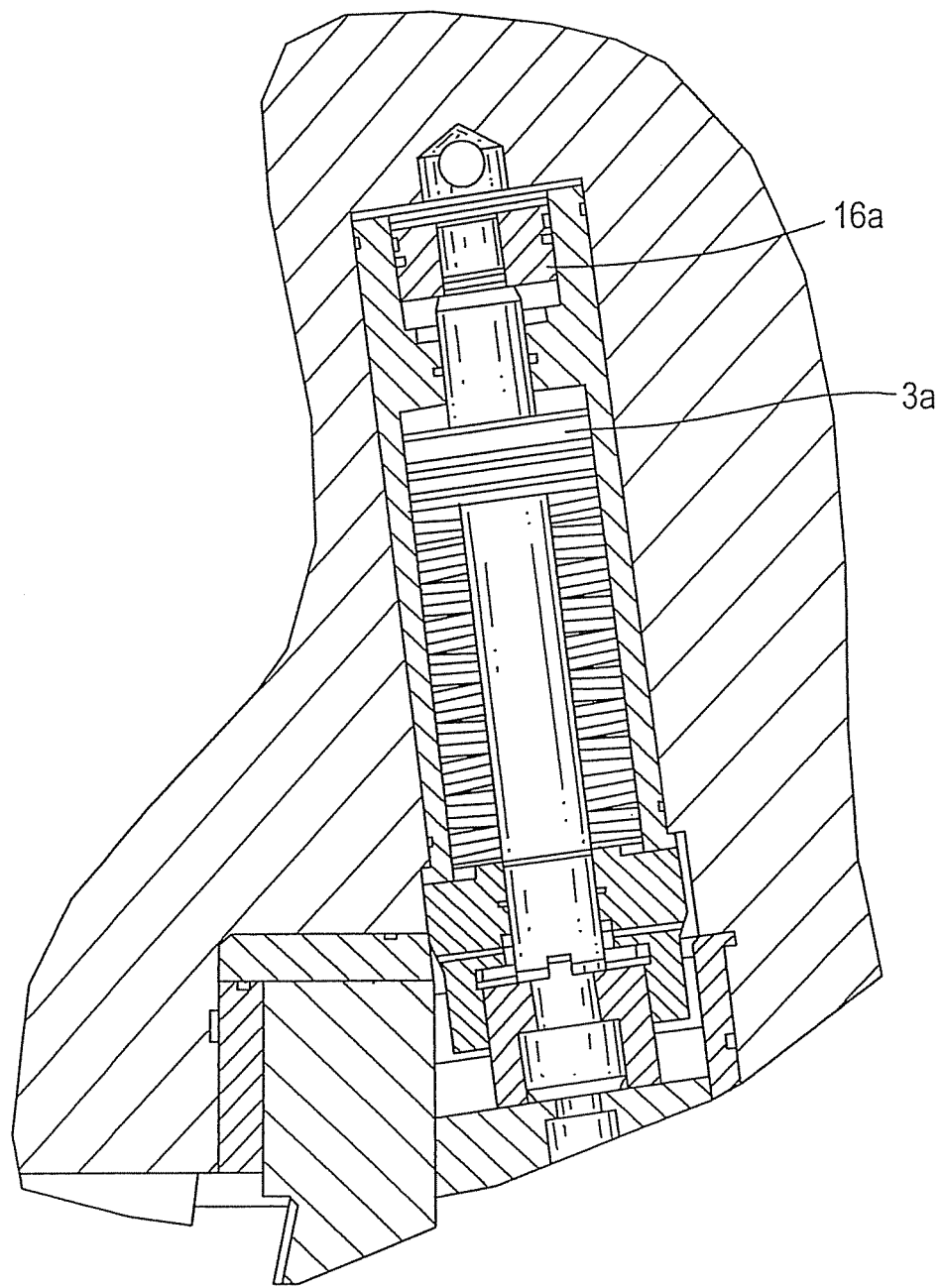
FIG. 4 a cross-sectional view of a still further embodiment of a clamping device according to the invention.
Figure 5:
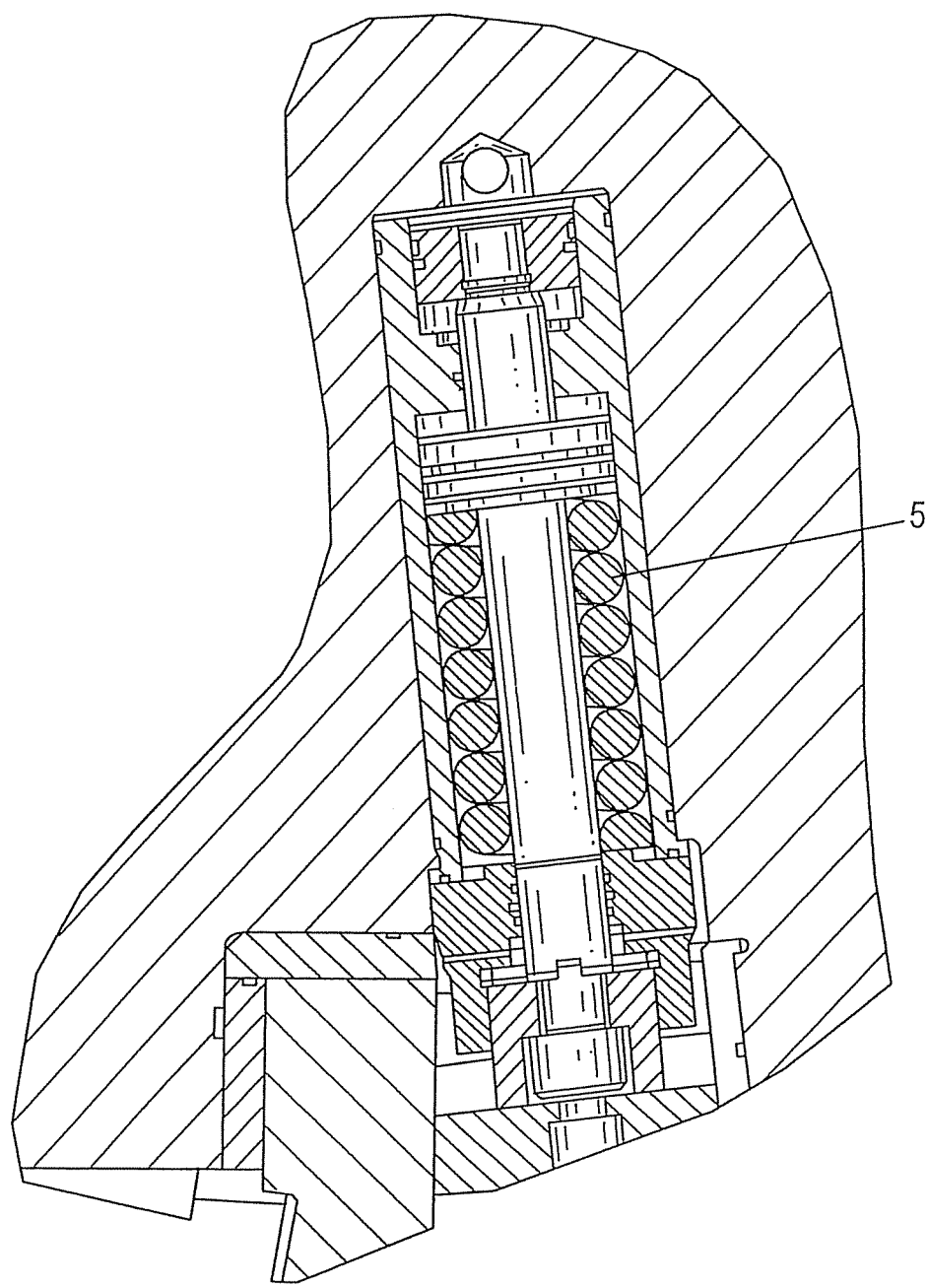
FIG. 5 a cross-sectional view of yet another embodiment of a clamping device according to the invention.

FIG. 3 shows an embodiment of the clamping device in which the diameters of the first piston rod 4a and the second piston rod 17a are different. FIG. 4 shows a further embodiment of the inventive clamping device in which the diameters of the first piston 3a and the second piston 16a are also different. FIG. 5 shows the compression spring 5 being formed as a spiral spring.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A device for clamping a blade of shears for transverse cutting strip and having a blade drum defining an elongate recess for receiving the blade, the clamping device comprising a clamping bar for clamping the blade in the elongate recess; a compression spring for biasing the clamping bar into a clamping position thereof; and means for displacing the clamping bar in a release position thereof, the displacing means including an elongate housing located in the blade drum and defining first and second chambers separated by a housing section extending transverse to a longitudinal extent of the housing, a first piston displaceable in the first chamber and having a piston rod connected, at an end thereof remote from the piston, with the clamping bar, the compression spring being located in the first chamber and engaging, at a spring end remote from the clamping bar, the first piston, and a second piston displaceable in the second chamber and having a rod section extendable through a bore formed in the transverse housing section and engageable with the first piston for applying pressure thereto upon application of pressure to the second piston, wherein space in front of the first piston and space in front of the second piston communicate with atmosphere, and space behind the first piston and in space behind the second piston communicate with a fluid source; and wherein a first connection-bore connects the space in the front of the first piston with the space in the front of the second piston, and a second connection bores connects the space behind the second piston with the space behind the first piston, wherein the first and second connection bores are formed in the rod section of the second piston.

2. A device according to claim 1, wherein the first piston, the piston rod of the first piston, and the rod section of the second piston are formed as a one-piece member.

3. A device according to claim 1, wherein the housing is formed as a tubular housing, the transverse housing section is formed as a cylindrical section, and both spaces are annular.

4. A device according to claim 1, wherein the housing is formed as one-piece housing.

5. A device according to claim 1, wherein the piston rod and the piston rod section have the same diameter.

6. A device according to claim 1, wherein diameters of the piston rod and the piston rod section have different diameters.

7. A device according to claim 1, wherein the first piston and the second piston have the same diameter.

8. A device according to claim 1, wherein the diameters of the first piston and of the second piston have different diameters.

9. A device according to claim 1, wherein the first and second pistons have seals.

10. A device according to claim 1, wherein the compression spring is a spiral spring.

11. A device according to claim 1, wherein the compression spring is a conical disc spring package.

* * * * *